(12) United States Patent
Sheen et al.

(10) Patent No.: US 8,142,591 B2
(45) Date of Patent: Mar. 27, 2012

(54) METHOD FOR PRODUCING LIQUID CRYSTAL DISPLAY ELEMENT WITHOUT SUBSTRATES

(75) Inventors: Yuung-Ching Sheen, Jhubei (TW); Juh-Shyong Lee, Hsinchu (TW); Wen-Ping Chuang, Sanchong (TW); Yih-Her Chang, Baoshan Township, Hsinchu County (TW); Su-Mei Wei, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 681 days.

(21) Appl. No.: 12/232,200

(22) Filed: Sep. 12, 2008

(65) Prior Publication Data

US 2009/0090459 A1    Apr. 9, 2009

Related U.S. Application Data

(63) Continuation-in-part of application No. 10/790,722, filed on Mar. 3, 2004, now abandoned.

(30) Foreign Application Priority Data

Nov. 18, 2003  (TW) .............................. 92132259 A

(51) Int. Cl.
| | |
|---|---|
| B29C 65/14 | (2006.01) |
| B29C 65/48 | (2006.01) |
| B32B 37/02 | (2006.01) |
| B32B 37/14 | (2006.01) |
| B32B 37/26 | (2006.01) |
| B32B 38/10 | (2006.01) |
| B32B 43/00 | (2006.01) |

(52) U.S. Cl. ........ 156/230; 156/239; 156/240; 156/247; 156/272.2; 156/273.9; 156/275.5; 156/307.1

(58) Field of Classification Search .................. 156/182, 156/230, 234, 235, 237, 239, 240, 247, 249, 156/272.2, 273.9, 275.5, 307.1; 349/86, 349/156, 158, 187

See application file for complete search history.

(56) References Cited

U.S. PATENT DOCUMENTS

| | | | | |
|---|---|---|---|---|
| 3,664,985 | A * | 5/1972 | Britt et al. ........................ | 528/25 |
| 4,473,603 | A | 9/1984 | Hockemeyer et al. | |
| 5,264,499 | A | 11/1993 | Hayashi et al. | |
| 6,126,991 | A * | 10/2000 | Stein ............................... | 427/140 |
| 6,912,038 | B2 * | 6/2005 | Liao et al. ...................... | 349/187 |
| 2004/0178527 | A1 * | 9/2004 | Liao et al. ...................... | 264/1.34 |

FOREIGN PATENT DOCUMENTS

| | | |
|---|---|---|
| JP | 3-207762 | 9/1991 |
| JP | 8-15672 | 1/1996 |
| JP | 2000-159895 | 6/2000 |
| JP | 2003-270620 | 9/2003 |

* cited by examiner

*Primary Examiner* — Sing P Chan
(74) *Attorney, Agent, or Firm* — Bacon & Thomas, PLLC

(57) ABSTRACT

The present invention relates to a method for liquid crystal display element without substrates, which comprises applying a release agent to assisting substrates in the process of producing the liquid crystal display so that the assembled liquid crystal display element can be separated from the assisting substrates and the liquid crystal display element is obtained, wherein said release agent comprises (a) 2-20 wt % of compounds selected from the group consisting of silicone, fluorine compounds and mixtures thereof; (b) 0.01-0.6 wt % of release modifier; and (c) a solvent as a complement to 100 wt %.

15 Claims, 3 Drawing Sheets

METHOD FOR PRODUCING LIQUID CRYSTAL DISPLAY ELEMENT WITHOUT SUBSTRATES

CROSS REFERENCES TO THE RELATED APPLICATIONS

This application is a Continuation-in-part of U.S. application Ser. No. 10/790,722, filed Mar. 3, 2004, now abandoned.

BACKGROUND OF THE INVENTION

1. Field of the Invention

The present invention relates to a release agent for fabricating a release agent layer used for a liquid crystal display element without substrates, which is applied to assisting substrates in the process of producing a liquid crystal display so that the assembled liquid crystal display element can be separated from the assisting substrates and the liquid crystal display element without substrates is obtained.

2. Description of the Related Art

The application of flat panel display (FPD) has helped reduce the weight and volume of display. The currently available liquid crystal display (LCD) technologies employ passive scan or active matrix to display images, which however requires considerable thickness stability for precision control. Otherwise even slight deformation will lead to serious image distortion. To bring about the thinner and more impact-resistant FPD, some of the FPD technologies for conventional glass substrate process have shifted focus to the R&D of plastic substrate. The development of flexible FPD has brought FPD to a new prospect in terms of thinness, impact-resistance and ease of carriage.

As for the substrate of flexible FPD, plastic materials have received the most attention for their characteristics of being lighter, thinner, more impact-resistant, mobile, and easy to carry. But in processes with temperature of 200° C. or higher, plastic material is prone to deformation or even decomposition, hence limiting its dimensions and applications. To bypass the shortcomings of plastic substrate, FPD without substrates is expected to be the process that draws the focus attention.

The patent of Philips entitled Liquid Crystal Display Laminate and Method of Manufacturing Such filed with WIPO (WO02/42832 A2) and published in Nature in 2002 reveals a process for single substrate LCD. The process employs UV radiation to produce polymerization and at the same time form polymer-covered liquid crystal with PSCOF (phase separated composite organic film) structure, which maintains uniformity on curved screens.

In the efforts to develop the lighter and thinner flexible FPD without substrates having greater design flexibility, release agent is one of the key materials and technologies for the new process. In U.S. Pat. No. 4,473,603, an adhesive-repellent composition is provided, which can impart release properties to substrates coated therewith. Besides, an organopolysiloxane composition for the formation of a cured release film is provided in U.S. Pat. No. 5,264,499. However, the two US patents both do not disclose a process of manufacture a liquid crystal display element without substrates used in the present invention.

For release agent used in the flexible FPD process without substrates, the drawbacks of plastic material, including poor resistance to high temperature and being prone to deformation can be overcome. The formulation of release agent can also be adjusted to give it good and uniform releasability. Such release agent may be used in liquid crystal display process without substrates and the LCD fabricated thereof can be applied in mobile phones and PDA in the near future. In essence, this is new technology for PC and communication equipment makers in the development of personal mobile electronic reading system.

SUMMARY OF THE INVENTION

The present invention discloses a method for producing liquid crystal display element without substrates, comprising following steps: manufacturing a first assisting substrate containing a release agent layer and a cured photosensitive material layer with an electrode pattern, wherein said cured photosensitive material layer is applied on said release agent layer and said electrode pattern is fabricated on said cured photosensitive material layer; manufacturing a second assisting substrate containing a release agent layer, a cured photosensitive material layer with an electrode pattern, an alignment layer, and a photo-polymerizable mixture which comprises a photosensitive material and a liquid crystal material, wherein said cured photosensitive material layer is applied on said release agent layer, said electrode pattern is fabricated on said cured photosensitive material layer, said alignment layer is applied on said cured photosensitive material layer and said photo-polymerizable mixture is applied on said alignment layer; assembling said first assisting substrate and said second assisting substrate and exposing to UV light to form a plurality of polymer walls between said first assisting substrate and said secondary assisting substrate, wherein said polymer walls surrounding said liquid crystal; and peeling off said first assisting substrate, said second assisting substrate and their respective release agent layer to form a liquid crystal display element without substrates; wherein said release agent layer is formed by coating a release agent on said first and second assisting substrate, respectively, and said release agent comprising: (a) 2-20 wt % of compounds selected from the group consisting of silicone, fluorine compounds and mixtures thereof; (b) 0.01-0.6 wt % of release modifier; and (c) a solvent as a complement to 100 wt %.

Preferably the aforesaid release agent comprises (a) 3-7 wt % of compounds selected from the group consisting of silicone, fluorine compounds and mixture thereof; and (b) 0.09-0.6 wt % of release modifier.

The aforesaid release modifier is a silicone modifier.

The aforesaid silicone modifier is a silicone compound having the following linear molecular structure:

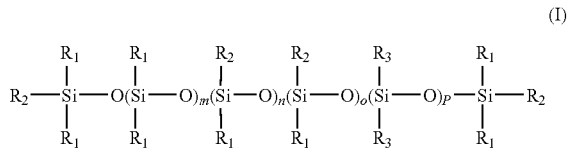

(I)

wherein $R_1$ is $C_{1-3}$ alkyl; $R_2$ is hydrogen atom, $C_{1-3}$ alkyl or $C_{2-10}$ alkenyl; $R_3$ is $C_{1-3}$ alkyl or phenyl; the aforesaid silicone compound has molecular weight of 3,500~30,000; if calculated by molecular weight, $(-Si(R_1)(R_1)O-)_m$ accounts for 55~100% of the silicone compound, $(-Si(R_1)(R_2)O-)_n$ accounts for 0~15%, $(-Si(R_1)(R_2)O-)_o$ accounts for 0~15%, and $(-Si(R_3)(R_3)O-)_p$ accounts for 0~15%.

The aforesaid silicone release modifier may also be a compound having the following cage molecular structure:

(II)

wherein $R_4$ is hydrogen atom or $C_{2-10}$ alkenyl; and q is an integer from 8 to 16.

The higher the proportion of alkenyl group in the aforesaid release modifier, the easier the release following the application of release agent.

The aforesaid release agent can further comprise a catalyst which comprises platinum catalyst, sulfuric acid, hydrochloride acid, or acetic acid.

The aforesaid release agent can further comprise a proper solvent which comprises toluene, n-heptane, methylethyl ketone or composition thereof.

The aforesaid release agent can further comprise a proper amount of inhibitor, such as alkynol compound or peroxide compound to enhance the operation life, i.e. pot life of release agent after mixture.

The aforesaid release agent can further comprise a proper amount of microparticles, such as nanometer grade $SiO_2$, $TiO_2$ or organic polymer particles.

The aforesaid assisting substrate comprises glass, wafer, TEFLON® (polytetrafluoroethylene (PTFE), DuPont), ceramic or polymer substrate.

The release agent of the present invention is used in the process of liquid crystal display without substrates to help the separation of assisting substrates from display element to obtain a display element without substrates. The aforesaid release agent is a key material in the new process of liquid crystal display without substrates, which breaks away from the traditional mode where liquid crystal display element is invariably affixed to a substrate. This new process overcomes the drawbacks of liquid crystal display element being unable to bend for it relies on the support of substrate or plastic substrate being prone to deformation under high temperature. It helps realize the goals of lighter, thinner and more flexible liquid crystal displays.

DETAILED DESCRIPTION OF THE INVENTION

Figure 1:
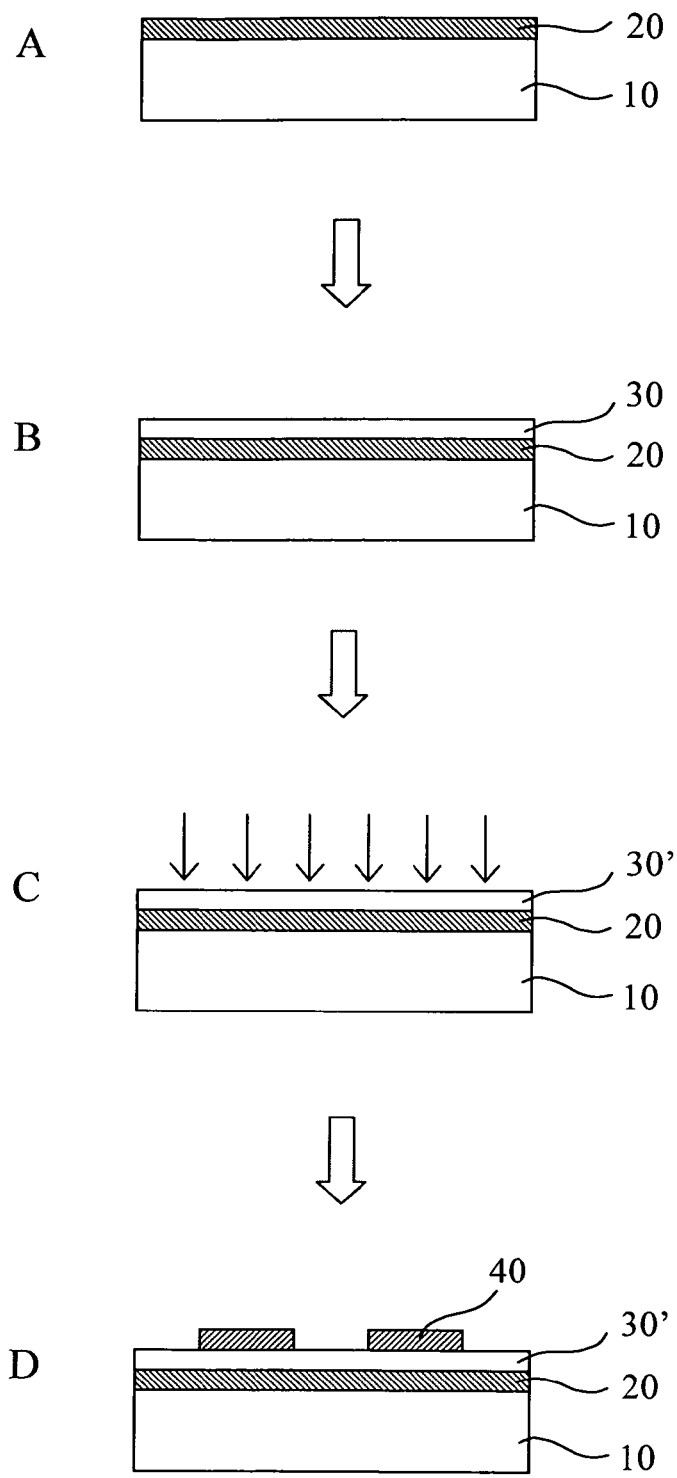
FIG. 1 illustrates the flow chart for the fabrication of first assisting substrate.

The present invention discloses a method for liquid crystal display element without substrates, comprising following steps: manufacturing a first assisting substrate containing a release agent layer and a cured photosensitive material layer with an electrode pattern, wherein said cured photosensitive material layer is applied on said release agent layer and said electrode pattern is fabricated on said cured photosensitive material layer; manufacturing a second assisting substrate containing a release agent layer, a cured photosensitive material layer with an electrode pattern, an alignment layer, and a photo-polymerizable mixture which comprises a photosensitive material and a liquid crystal material; wherein said cured photosensitive material layer is applied on said release agent layer, said electrode pattern is fabricated on said cured photosensitive material layer, said alignment layer is applied on said cured photosensitive material layer and said photo-polymerizable mixture is applied on said alignment layer; assembling said first assisting substrate and said second assisting substrate and exposing to UV light to form a plurality of polymer walls between said first assisting substrate and said secondary assisting substrate, wherein said polymer walls surrounding said liquid crystal; and peeling off said first assisting substrate, said second assisting substrate and their respective release agent layer to form a liquid crystal display element without substrates; wherein said release agent layer is formed by coating a release agent on said first and second assisting substrate, respectively, and said release agent comprising: (a) 2-20 wt % of compounds selected from the group consisting of silicone, fluorine compounds and mixtures thereof; (b) 0.01-0.6 wt % of release modifier; and (c) a solvent as a complement to 100 wt %.

Preferably the aforesaid release agent comprises of (a) 3-7 wt % of compounds selected from the group consisting of silicone, fluorine compounds and mixture thereof; and (b) 0.09-0.6 wt % of release modifier.

The aforesaid silicone is a silicone polymer which contains Si—H and Si—CH=$CH_2$, with the molar ratio of Si—H to Si—CH=$CH_2$ between 1.2 and 4.8, preferably between 2.0 and 3.5, and with molecular weight of between 100,000 and 1,000,000, preferably between 300,000 and 700,000. The aforesaid fluorine compound comprises TEFLON®, silicon fluoride, and fluothane.

The aforesaid release modifier is a silicone modifier.

The aforesaid silicone modifier is a silicone compound having the following linear molecular structure:

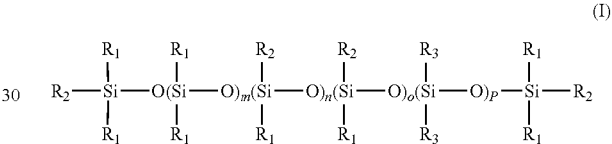

(I)

wherein $R_1$ is $C_{1-3}$ alkyl, preferably methyl; $R_2$ is hydrogen atom, $C_{1-3}$ alkyl or $C_{2-10}$ alkenyl, preferably hydrogen atom, vinyl or methyl; $R_3$ is $C_{1-3}$ alkyl or phenyl, preferably methyl or phenyl; the aforesaid silicone compound has molecular weight between 3,500 and 30,000; if calculated by molecular weight, (—Si($R_1$)($R_1$)O—)$_m$ accounts for 55~100% of silicone compound, (—Si($R_1$)($R_2$)O—)$_n$ accounts for 0~15%, (—Si($R_1$)($R_2$)O—)$_o$ accounts for 0~15%, and (—Si($R_3$)($R_3$)O—)$_p$ accounts for 0~15%, preferably (—Si($R_1$)($R_1$)O—)$_m$ accounts for 85~100% of silicone compound, (—Si($R_1$)($R_2$)O—)$_n$ accounts for 0~5%, (—Si($R_1$)($R_2$)O—)$_o$ accounts for 0~5%, and (—Si($R_3$)($R_3$)O—)$_p$ accounts for 0~5%.

The aforesaid silicone compound having linear molecular structure is prepared by copolymerization of silicone monomers under high temperature in the presence of a catalyst and subsequently the having reacted catalyst removed and unreacted monomers and low-molecular-weight oligomers removed under high vacuum. Examples of said silicone monomers include: cyclic (—Si($CH_3$)($CH_3$)O—)$_3$, (—Si($CH_3$)($CH_3$)O—)$_4$, (—Si($CH_3$)($CH_3$)O—)$_5$, (—Si($CH_3$)($CHCH_2$)O—)$_4$, (—Si($CH_3$)(H)O—)$_4$, or similar cyclic monomer mixtures, $H_2C$=CH—Si($CH_3$)$_2$—O—Si($CH_3$)$_2$—CH=$CH_2$, H—Si($CH_3$)$_2$—O—Si($CH_3$)$_2$—H, PhSi$CH_3$ ($OCH_3$)$_2$, and $Ph_2$Si ($OCH_3$)$_2$, wherein Ph represents phenyl; the catalyst can be a strong acid solution.

The aforesaid silicone release modifier may also be a compound having the following cage molecular structure:

(II)

wherein $R_4$ is hydrogen atom or $C_{2-10}$ alkenyl, preferably hydrogen atom or vinyl; and q is an integer from 8 to 16.

The aforesaid silicone compound having cage molecular structure is prepared by dissolving T-type silicone monomers in an organic solvent and undergoing hydrolysis and condensation reactions with water and a catalyst. After removing the catalyst and water and condensing the leftover solvent in the resulting reactant, the cage-type silicone compound is obtained. Examples of said silicone monomers include $HSiCl_3$, $CH_2CHSi(OCH_3)_3$, and $Si(OC_2H_5)_4$; the aforesaid catalyst can be sulfuric acid, hydrochloride acid, or acetic acid.

The aforesaid compound having cage molecular structure may be acquired on the market, such as SST-V8V01 (poly (vinylsilsesquioxane)-T8) or SST-H8H01 (poly(hydridosilsesquioxane)-T8) from Gelest Inc.

The higher the proportion of alkenyl group in the aforesaid release modifier, the easier the release following the application of release agent.

The aforesaid release agent can further comprise a catalyst which comprises platinum catalyst, sulphuric acid, hydrochloric acid, or acetic acid.

The aforesaid release agent can further comprise a proper solvent, such as toluene, n-heptane, methylethyl ketone or composition thereof.

The aforesaid release agent can further comprise a proper amount of inhibitor, such as alkynol compound or peroxide to enhance the operation life, i.e. pot life of release agent after mixture.

The aforesaid release agent can further contain a proper amount of microparticles, such as nanometer grade $SiO_2$, $TiO_2$ or organic polymer particles.

The aforesaid release agent can be further reformulated in consideration of the assisting substrate to be separated to give it greater separation property.

The aforesaid release agent may be spin coated, dip coated or roll coated.

The aforesaid assisting substrate comprises glass, chip, TEFLON®, ceramic or polymer substrate.

The advantages of the present invention are further depicted with the illustration of examples, but the descriptions made in the examples should not be construed as a limitation on the actual application of the present invention.

The symbols of monomers depicted in the examples are defined as follows:

$D_4$: (—Si(CH$_3$)(CH$_3$)O—)$_4$
$D_4^{Vi}$: (—Si(CH$_3$)(CHCH$_2$)O—)$_4$
$D_4^{H}$: (—Si(CH$_3$)(H)O—)$_4$
DPh: $Ph_2Si(OR_2)$, Ph represents phenyl and R represents $CH_3$
$M_2^{Vi}$: $H_2C=CH—Si(CH_3)_2—O—Si(CH_3)_2—CH=CH_2$
$M_2^{H}$: $H—Si(CH_3)_2—O—Si(CH_3)_2—H$

Example 1

Preparation of Linear Release Modifier

Weigh 0.43 g of $D_4^{Vi}$ monomer, 1.86 g of $M_2^{Vi}$ monomer, 47.71 g of $D_4$ monomer, and 0.13 g of 0.25 wt % sulfuric acid aqueous solution, and place them in the reaction bottle of rotative reactor. Cap the reaction bottle and turn on the rotative reactor. Raise the temperature of reactor to 80° C. and react for 2 hours, then raise the temperature to 130° C. and react for 1 hour. After the reaction, drop the temperature and take out the resulting solution and neutralize it with 0.22 g of $NaHCO_3$. Agitate the resulting mixture well and remove the salts by centrifugation. Subsequently, place the mixture in evaporator, set the temperature at 180° C., and turn on the vacuum motor. After the atmospheric pressure is below 1.0 torr, remove oligomers of low molecular weight, then raise the temperature to 200° C. and maintain for 2 hours until no more distillate comes out. The linear release modifier obtained thereof (Sample No. SS-197) has the following structure and predetermined molecular weight of approximately 5000, in which the vinyl content is about 0.1 mol/1000 g.

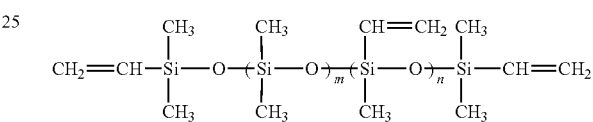

Examples 2~6

Preparation of Linear Release Modifier

Prepare linear release modifiers using the data shown in Table 1 and the same method as that in Example 1. The linear release modifiers obtained thereof are numbered Samples No. SS-198 to SS-202. Sample No. SS-198 to SS-199 have the same structure as that of SS-197; Samples No. SS-200 to SS202 have the following structure. Other data are illustrated in Table 1.

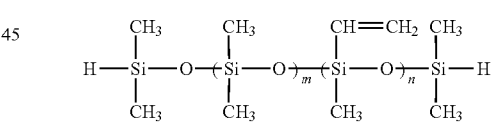

TABLE 1

|  |  | Example No. | | | | | |
| --- | --- | --- | --- | --- | --- | --- | --- |
|  |  | 1 | 2 | 3 | 4 | 5 | 6 |
|  | Sample No. | SS-197 | SS-198 | SS-199 | SS-200 | SS-201 | SS-202 |
| Monomer | $D_4^{Vi}$ | 0.43 | 0.86 | 1.29 | 0.43 | 0.86 | 1.29 |
| (g) | $M_2^{Vi}$ | 1.86 | 1.86 | 1.86 | — | — | — |
|  | $M_2^{H}$ | — | — | — | 1.34 | 1.34 | 1.34 |
|  | $D_4$ | 47.71 | 47.28 | 46.85 | 48.23 | 47.80 | 47.37 |
| Catalyst | $H_2SO_4$ (0.25 wt %) | 0.13 g | 0.13 g | 0.13 g | 0.13 g | 0.13 g | 0.13 g |
| Neutralizer | $NaHCO_3$ | 0.22 g | 0.22 g | 0.22 g | 0.22 g | 0.22 g | 0.22 g |
|  | Predetermined molecular weight | 5000 | 5000 | 5000 | 5000 | 5000 | 5000 |
|  | Vinyl content (mol/1000 g) | 0.1 | 0.2 | 0.3 | 0.1 | 0.2 | 0.3 |

Examples 7~13

Preparation of Release Agent

Take the release modifier respectively prepared in Examples 1~6, No. SS-203 and KE-82-VBS from Shin-Etsu Chemical, toluene, and platinum catalyst CAT-PL-50T diluted to 10% by toluene in an amount as shown in Table 2, and place them in an agitator and mix well. After complete deaeration, the release agents of the present invention are obtained. Measure the viscosity and solid content of the release agents.

Sample No. SS-203 has the following structure:

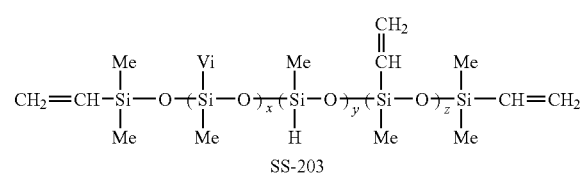

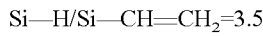

Molecule weight: 660,000

Apply the prepared release agent to 50 μm PET film with 4# wire rod (9 μm) or dip coat on glass, and evaluate its coatability and adhesion.

Adhere one side of the double-sided 3M tape to a glass slide (5 cm×10 cm×0.2 cm) and the other side to the aforesaid release-coated PET specimen. Cut the PET specimen to the size of glass slide. Adhere Tesa 7475 standard test tape (2.5 cm×13 cm) to the release-coated PET specimen. Stick a release paper strip (2.5 cm×15 cm) to the other side of test tape. The release paper strip is hung with a pull ring which is secured by staple. Use a pull tester (Adhesion/Release Tester AR-1000) to test the release force of Tesa 7475 standard tape at the pull speed of 12 inch/min. The results are as shown in Table 2.

Next, the subject release agents prepared in Examples 7-13 to release testing using X7R green tape and the method described below.

Apply the release agent to 50 μm PET film with 4# wire rod (9 μm). Bake for 60 seconds under 130±5° C., then cool overnight. Use 4# wire rod to apply X7R slurry on the release-coated PET film. Bake under 100±5° C. for 30 seconds, then cool overnight. Adhere one side of the double-sided 3M tape to a glass slide (5 cm×10 cm×0.2 cm) and the other side to release-coated PET film painted with X7R green tape. Cut the PET specimen to the size of glass. Adhere Tesa 7475 standard test tape (2.5 cm×13 cm) to the surface of X7R. Stick a release paper strip (2.5 cm×15 cm) to the other side of test tape and hang a pull ring to the release paper strip which is secured by staple. Use a pull tester (Adhesion/Release Tester AR-1000) to test the release force of X7R green tape at the pull speed of 12 inch/min. The results are as shown in Table 2.

TABLE 2

| Content(g) | 7 | 8 | 9 | 10 | 11 | 12 | 13 |
|---|---|---|---|---|---|---|---|
| SS-197 | 1 | | | | | | |
| SS-198 | | 1 | 1 | | | | |
| SS-199 | | | | 1 | | | |
| SS-200 | | | | | 1 | | |
| SS-201 | | | | | | 1 | |
| SS-202 | | | | | | | |
| SS-203 | 9 | 9 | 9 | 9 | 9 | 9 | 8.6 |
| KE-82-VBS (25% S.C.) | | | | | | | 1.8 |
| Toluene | 40 | 40 | 40 | 40 | 40 | 40 | 24 |
| 10% CAT-PL-50T | 1.2 | 1.2 | 1.2 | 1.2 | 1.2 | 1.2 | 1 |
| Viscosity (CPS) | 44 | 45 | 45 | 46 | 45-46 | 45 | 33 |
| Solid content (%) | 7.23 | 7.23 | 7.23 | 7.23 | 7.23 | 7.23 | 6.2 |
| PET coatability | good | good | good | good | good | good | good |
| PET adhesion | good | good | good | good | good | good | excellent |
| Tesa 7475 standard tape release force | 15-26 | 13-19 | 12-26 | 5-7 | 8-10 | 7-9 | 5-7 |
| | 18-28 | 13-20 | 14-28 | 5-7 | 7-9 | 7-9 | 5-7 |
| | 16-26 | 14-20 | 11-24 | 4-6 | 7-9 | 7-9 | 5-7 |
| Avg. (g/inch) | 21 ± 5 | 17 ± 3 | 19 ± 7 | 6 ± 1 | 7 ± 1 | 8 ± 1 | 6 ± 1 |
| X7R green tape release force | 2.8-3.2 | 2.8-3.2 | 2.7-3.2 | 2.7-3.2 | 2.7-3.2 | 3.0-3.3 | 2.2-2.5 |
| | 2.7-3.1 | 2.7-3.2 | 2.7-3.2 | 3.0-3.3 | 2.7-3.2 | 3.0-3.5 | 2.2-2.4 |
| | 2.6-3.0 | 2.7-3.2 | 2.7-3.2 | 2.8-3.3 | 2.7-3.2 | 2.9-3.4 | 2.2-2.5 |
| Avg. (g/in) | 2.9 ± 0.2 | 3.0 ± 0.2 | 2.9 ± 0.3 | 3.0 ± 0.3 | 3.0 ± 0.3 | 3.2 ± 0.2 | 2.4 ± 0.2 |

Evaluation standards for PET coatability: excellent (uniform film thickness and flat); good (some shrinkage); poor (exhibiting creases).

Evaluation standards for PET adhesion: excellent (no peeling after rubbing 3-5 times with an eraser); good (no peeling after rubbing 1-2 times with an eraser); poor (peel-off immediately after rubbing).

Next, the subject release agents prepared in Examples 7-13 to release testing using Tesa 7475 standard tape and the method described below.

Let the prepared release agent composition stand for 30 minutes, apply it to 50 μm PET film with 4# wire rod (9 μm). Bake for 60 seconds under 130±5° C., then cool overnight.

As shown in Table 2, the PET coatabilities of release agents prepared in Examples 7-13 are good where some shrinkage occurred; the PET adhesions in Examples 7-12 are also good, whereas the release agent in Example 13 exhibited good PET adhesion. By Tesa 7475 standard tape test results, the release force of release agents in Examples 10-13 was markedly smaller than that of release agents in Examples 7-9, indicating that the release agents in Examples 10-13 have better releasability. By the X7R green tape test results, the release agent in Example 13 displayed the smallest release force, which however differs little from that of release agents in Examples 7-12.

Example 14

Process of a Liquid Crystal Display Element without Substrates

The manufacturing of the first assisting substrate 10 is carried out first. As shown in FIG. 1A, apply the release agent prepared in example 10 on first assisting substrate 10 to form a release agent layer 20. Next, apply the photosensitive material 30 on the release agent layer 20 as shown in FIG. 1B; as shown in FIG. 1C, irradiate 365 nm UV light on the photosensitive material 30 to form a cured photosensitive material layer 30'; as shown in FIG. 1D, fabricate the electrode pattern 40 on the cured release agent layer 30'.

Figure 2:
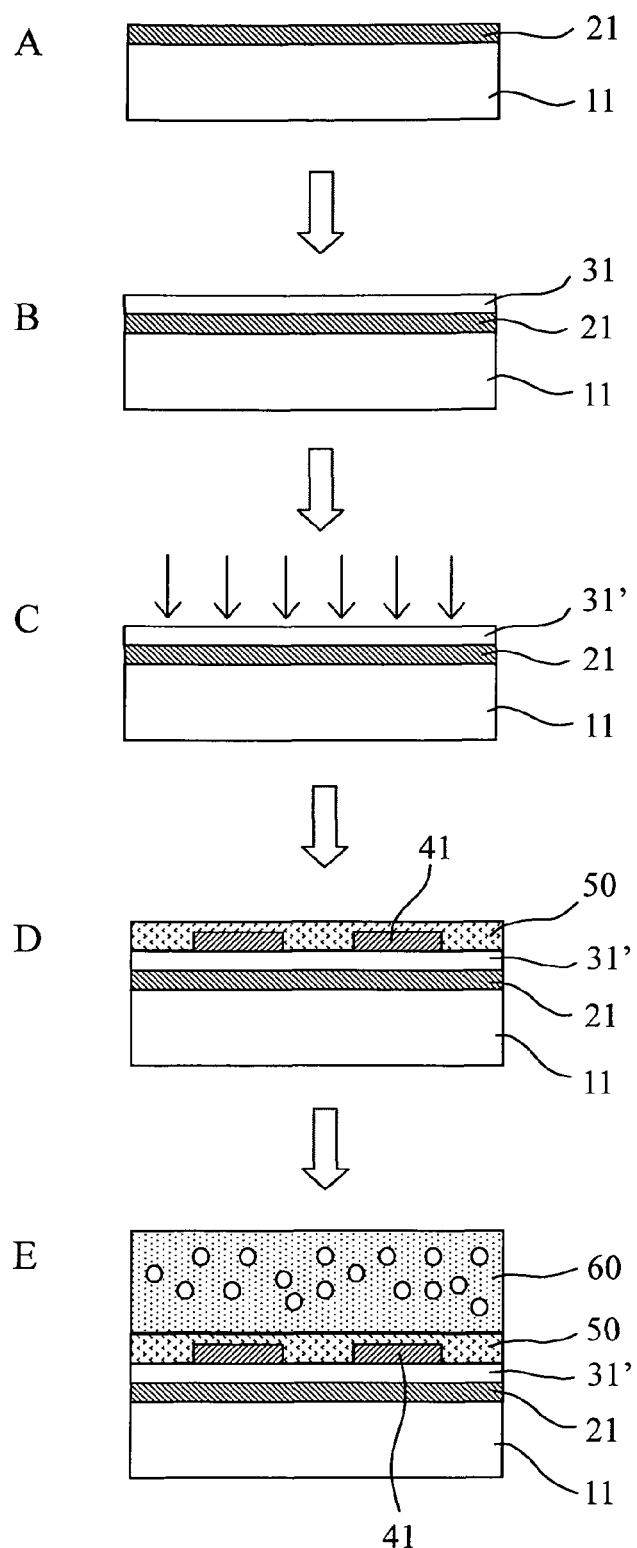
FIG. 2 illustrates the flow chart for the fabrication of second assisting substrate.

Next carry out the manufacturing of the second assisting substrate 11. As shown in FIG. 2A~2C, the steps in the process are the same as those in the manufacturing of the first assisting substrate: first apply the release agent layer 21 on the second assisting substrate 11 as shown in FIG. 2A. Next apply the photosensitive material 31 on the release agent layer 21 as shown in FIG. 2B, then polymerize and cure the photosensitive material with UV light to form the cured photosensitive material layer 31' as shown in FIG. 2C. Then fabricate the electrode pattern 41 on the cured photosensitive material layer 31' as shown in FIG. 2D and coat the alignment layer 50. Subsequently apply the photo-polymerizable mixture 60, which contains a photosensitive material and a liquid crystal material on alignment layer 50 as shown in FIG. 2E.

Figure 3:
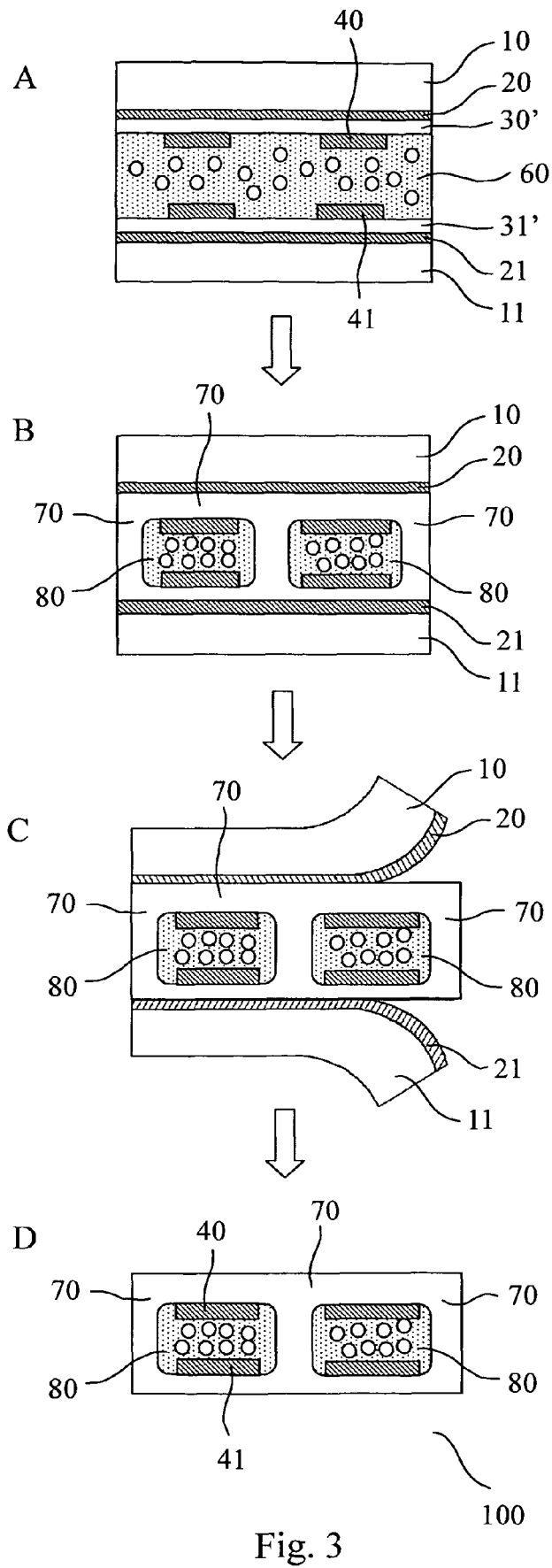
FIG. 3 illustrates the flow chart for the fabrication of a display element without substrates.

FIG. 3 depicts the process of assembling the first assisting substrate 10 and second assisting substrate 11. As shown in FIG. 3A, place the first assisting substrate 10 upside down over the second assisting substrate 11 and align, and then expose the two substrates to light through photomask (not shown in the figure); after exposure, the photo-polymerizable mixture 60 forms a plurality of polymer walls 70 which adjoin the first assisting substrate 10 and the second assisting substrate 11, and induce the phase-separation between the liquid crystal and photosensitive material with polymer walls 70 surrounding the liquid crystal 80 as shown in FIG. 3B; next, peel off the first assisting substrate 10, the second assisting substrate 11, and their respective release agent layer 20 and 21 as shown in FIG. 3C; finally, the liquid crystal display element 100 without substrates is obtained as shown in FIG. 3D.

What is claimed is:

1. A method for producing liquid crystal display element without substrates, comprising following steps:
    manufacturing a first assisting substrate containing a release agent layer and a cured photosensitive material layer with an electrode pattern, wherein said cured photosensitive material layer is applied on said release agent layer and said electrode pattern is fabricated on said cured photosensitive material layer;
    manufacturing a second assisting substrate containing a release agent layer, a cured photosensitive material layer with an electrode pattern, an alignment layer, and a photo-polymerizable mixture which comprises a photosensitive material and a liquid crystal material; wherein said cured photosensitive material layer is applied on said release agent layer, said electrode pattern is fabricated on said cured photosensitive material layer, said alignment layer is applied on said cured photosensitive material layer and said electrode pattern and said photo-polymerizable mixture is applied on said alignment layer;
    assembling said first assisting substrate and said second assisting substrate and exposing said photo-polymerizable mixture to UV light through a mask to form a plurality of polymer walls between said first assisting substrate and said secondary assisting substrate, wherein said polymer walls surrounding said liquid crystal; and
    peeling off said first assisting substrate, said second assisting substrate and their respective release agent layer to form a liquid crystal display element without substrates;
    wherein said release agent layer is formed by coating a release agent on said first and second assisting substrate, respectively, and said release agent comprising:
        (a) 2-20 wt % of compounds selected from the group consisting of silicone, fluorine compounds and mixtures thereof
        (b) 0.01-0.6 wt % of release modifier; and
        (c) a solvent as a complement to 100 wt %; and
    wherein said release modifier is a silicon release modifier selected from the group consisting of:
    (i) a silicone compound having the following linear molecular structure:

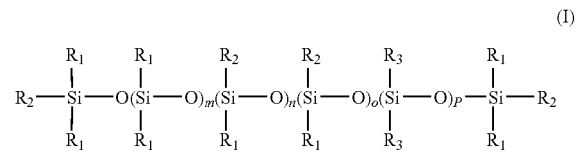

(I)

wherein $R_1$ is $C_{1-3}$ alkyl; $R_2$ is hydrogen atom, $C_{1-3}$ alkyl or $C_{2-10}$ alkenyl; $R_3$ is $C_{1-3}$ alkyl or phenyl; said silicone compound has molecular weight of 3,500~30,000; when calculated by molecular weight, $(-Si(R_1)(R_1)O-)_m$ accounts for 55~100% of silicone compound, $(-Si(R_1)(R_2)O-)_n$ accounts for 0~15%, $(-Si(R_1)(R_2)O-)_o$ accounts for 0~15%, and $(-Si(R_3)(R_3)O-)_p$ accounts for 0~15%, and
(ii) a compound having the following cage molecular structure:

(II)

wherein $R_4$ is hydrogen atom or $C_{2-10}$ alkenyl; and q is an integer from 8 to 16.

2. The method for producing liquid crystal display element without substrates according to claim 1, wherein said release agent comprises (a) 3-7 wt % of compounds selected from the group consisting of silicone, fluorine compounds and mixtures thereof; and (b) 0.09-0.6 wt % of release modifier.

3. The method for producing liquid crystal display element without substrates according to claim 1, wherein $R_1$ is methyl.

4. The method for producing liquid crystal display element without substrates according to claim 1, wherein $R_3$ is methyl or phenyl.

5. The method for producing liquid crystal display element without substrates according to claim 1, wherein when calculated by the molecular weight, $(-Si(R_1)(R_1)O-)_m$ accounts for 85~100% of silicone compound, $(-Si(R_1)(R_2)O-)_n$ accounts for 0~5%, $(-Si(R_1)(R_2)O-)_o$ accounts for 0~5%, and $(-Si(R_3)(R_3)O-)_p$ accounts for 0~5%.

6. The method for producing liquid crystal display element without substrates according to claim 1, wherein said release agent further comprises a catalyst which includes platinum catalyst, sulfuric acid, hydrochloride acid, or acetic acid.

7. The method for producing liquid crystal display element without substrates according to claim 1, wherein said release agent further comprises a solvent which includes toluene, n-heptane, methylethyl ketone or mixture thereof.

8. The method for producing liquid crystal display element without substrates according to claim 1, wherein said release agent further comprises an inhibitor, which includes alkynol compound or peroxide compound.

9. The method for producing liquid crystal display element without substrates according to claim 1, wherein said release agent further comprises microparticles, which include nanometer grade $SiO_2$, $TiO_2$ or organic polymer particles.

10. The method for producing liquid crystal display element without substrates according to claim 1, wherein said assisting substrates comprise glass, wafer, polytetrafluoroethylene (PTFE), ceramic or polymer substrate.

11. The method for producing liquid crystal display element without substrates according to claim 1, wherein said silicone is a silicone polymer comprises Si—H and Si—CH=$CH_2$ with molar ratio of Si—H to Si—CH=$CH_2$ between 1.2 and 4.8 and molecular weight between 100,000 and 1,000,000.

12. The method for producing liquid crystal display element without substrates according to claim 11, wherein said silicone is a silicone polymer comprises Si—H and Si—CH=$CH_2$ with molar ratio of Si—H to Si—CH=$CH_2$ between 2.0 and 3.5 and molecular weight between 300,000 and 700,000.

13. The method for producing liquid crystal display element without substrates according to claim 1, wherein said fluorine compound comprises polytetrafluoroethylene (PTFE), silicon fluoride, and fluothane.

14. The method for producing liquid crystal display element without substrates according to claim 1, wherein said silicon release modifier is a silicone compound having the following linear molecular structure:

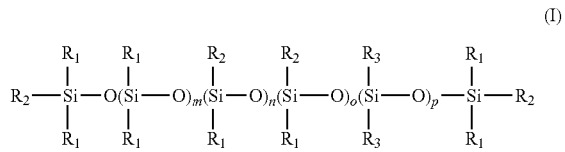

(I)

wherein $R_1$ is $C_{1-3}$ alkyl; $R_2$ is hydrogen atom, $C_{1-3}$ alkyl or $C_{2-10}$ alkenyl; $R_3$ is $C_{1-3}$ alkyl or phenyl; said silicone compound has molecular weight of 3,500~30,000; when calculated by molecular weight, (—Si($R_1$)($R_1$)O—)$_m$ accounts for 55~100% of silicone compound, (—Si($R_1$)($R_2$)O—)$_n$ accounts for 0~15%, (—Si($R_1$)($R_2$)O—)$_o$ accounts for 0~15%, and (—Si($R_3$)($R_3$)O—)$_p$ accounts for 0~15%.

15. The method for producing liquid crystal display element without substrates according to claim 1, wherein said silicon release modifier is a compound having the following cage molecular structure:

(II)

wherein $R_4$ is hydrogen atom or $C_{2-10}$ alkenyl; and q is an integer from 8 to 16.

* * * * *